US012582050B2

(12) United States Patent　　　　　(10) Patent No.:　US 12,582,050 B2
Huttunen　　　　　　　　　　　　　　(45) Date of Patent:　Mar. 24, 2026

(54) OPEN-TOP GUTTER

(71) Applicant: GREEN AUTOMATION GROUP OY, Helsinki (FI)

(72) Inventor: Jukka Huttunen, Unaja (FI)

(73) Assignee: Green Automation Group Oy, Helsinki (FI)

( * ) Notice: Subject to any disclaimer, the term of this patent is extended or adjusted under 35 U.S.C. 154(b) by 0 days.

(21) Appl. No.: 18/816,537

(22) Filed: Aug. 27, 2024

(65) Prior Publication Data

US 2024/0415071 A1　　　Dec. 19, 2024

Related U.S. Application Data

(62) Division of application No. 17/285,211, filed as application No. PCT/FI2019/050763 on Oct. 25, 2019, now Pat. No. 12,096,732.

(30) Foreign Application Priority Data

Oct. 29, 2018　(FI) ...................................... 20187155
Jan. 8, 2019　(FI) ...................................... 20197004

(51) Int. Cl.
　　*A01G 9/04*　　　　(2006.01)
　　*A01G 27/00*　　　(2006.01)
　　*A01G 31/06*　　　(2006.01)
(52) U.S. Cl.
　　CPC ........... *A01G 9/047* (2013.01); *A01G 27/006* (2013.01); *A01G 31/06* (2013.01)

(58) Field of Classification Search
　　CPC ...... A01G 9/1476; A01G 9/047; A01G 9/086; A01G 9/028; A01G 31/02; A01G 31/06; A01G 27/001; A01G 27/006; E04D 13/064
　　See application file for complete search history.

(56) References Cited

U.S. PATENT DOCUMENTS

| | | |
|---|---|---|
| 3,849,932 A | 11/1974 | Adams |
| 4,014,135 A | 3/1977 | Greenbaum |
| 4,075,785 A | 2/1978 | Jones |
| 4,107,876 A | 8/1978 | Greenbaum |
| 4,178,715 A | 12/1979 | Greenbaum |
| 4,242,834 A | 1/1981 | Olsen |
| 4,250,663 A | 2/1981 | Merritt |

(Continued)

FOREIGN PATENT DOCUMENTS

| | | |
|---|---|---|
| EP | 0 301 619 A1 | 2/1989 |
| EP | 0371545 A1 | 6/1990 |

(Continued)

OTHER PUBLICATIONS

Mar. 7, 2025 Office Action issued in Japanese Patent Application No. 2024-030093 (English Translation).

(Continued)

*Primary Examiner* — Trinh T Nguyen
(74) *Attorney, Agent, or Firm* — Oliff PLC

(57)　　　　　　ABSTRACT

An open-top gutter for cultivation of plants. In an example, the open-top gutter includes a space limited by two side walls and a bottom wall and divided into trough-like compartments by at least one dividing wall. The dividing wall includes at least one water space formed by a double wall, open at the bottom of the gutter.

16 Claims, 5 Drawing Sheets

(56) References Cited

U.S. PATENT DOCUMENTS

| | | | |
|---|---|---|---|
| 4,255,898 | A | 3/1981 | Greenbaum |
| 5,010,686 | A | 4/1991 | Rivest |
| 5,203,109 | A | 4/1993 | Simon et al. |
| 7,392,616 | B1 | 7/2008 | Bagby |
| 8,910,418 | B2 | 12/2014 | Khoo |
| 9,149,006 | B1 | 10/2015 | Pope |
| 10,051,799 | B1 | 8/2018 | Van Wingerden |
| 10,973,184 | B1 | 4/2021 | Yin |
| 11,483,982 | B2 | 11/2022 | Li |
| 2005/0246956 | A1 | 11/2005 | Gonzalez Miguez |
| 2018/0064046 | A1* | 3/2018 | Kantola ................ A01G 9/047 |

FOREIGN PATENT DOCUMENTS

| | | |
|---|---|---|
| FI | 126323 B | 9/2016 |
| FR | 3039036 A1 | 1/2017 |
| GB | 1320940 A | 6/1973 |
| GB | 2030037 A | 4/1980 |
| JP | S47-19258 Y1 | 7/1972 |
| JP | S53-107936 A | 9/1978 |
| JP | H03-65454 U | 6/1991 |
| JP | H08-266173 A | 10/1996 |
| JP | 2007-151543 A | 6/2007 |
| NL | 8401638 A | 12/1985 |
| RU | 17391 U1 | 4/2001 |
| RU | 67391 U1 | 10/2007 |
| SE | 428751 B | 7/1983 |
| SU | 1428310 A1 | 10/1988 |
| WO | 2012/172187 A1 | 12/2012 |
| WO | 2016/151186 A1 | 9/2016 |
| WO | 2017/035410 A1 | 3/2017 |

OTHER PUBLICATIONS

Jan. 23, 2020 International Search Report issued in International Patent Application No. PCT/FI2019/050763.

Jan. 23, 2020 Written Opinion issued in International Patent Application No. PCT/FI2019/050763.

Dec. 16, 2021 Office Action issued in Russian Patent Application No. 2021115286.

May 9, 2023 Office Action issued in Japanese Patent Application No. 2021-547952.

Design Application No. 90013134070004 filed Jul. 2, 2012.

Sep. 11, 2024 Notice of Opposition issued in European Patent Application No. 19880466.8.

Oct. 1, 2025 Office Action issued in U.S. Appl. No. 18/968,175.

* cited by examiner

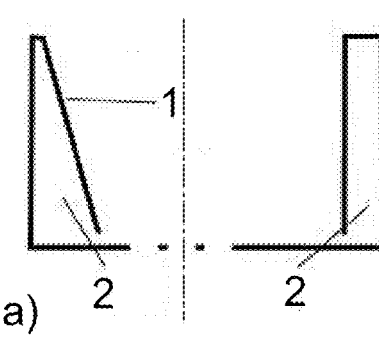
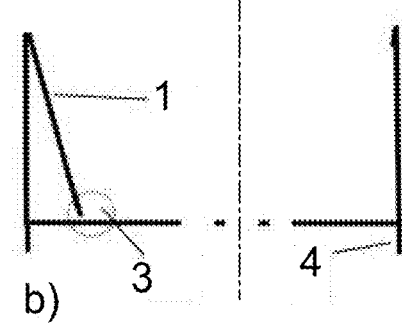
a)          b)
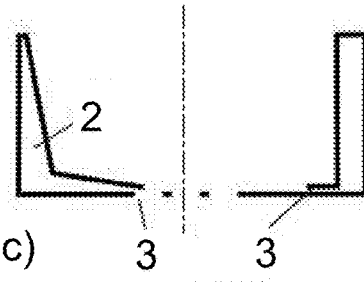
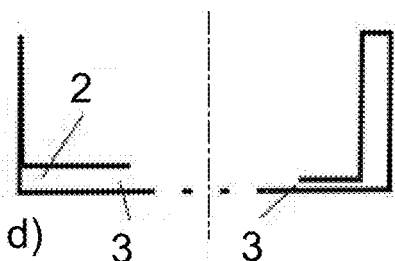
c)          d)
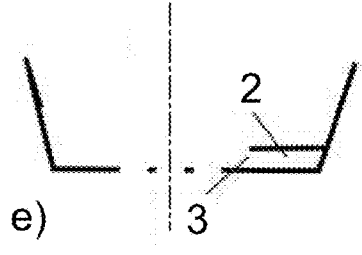
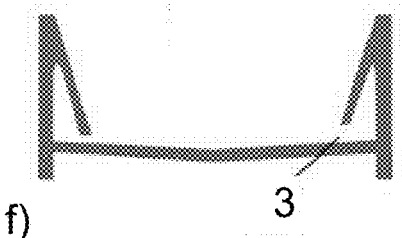
e)          f)
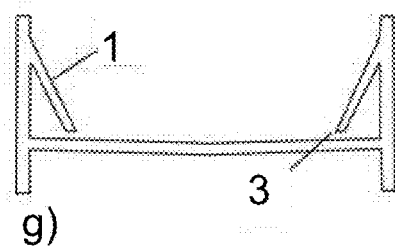
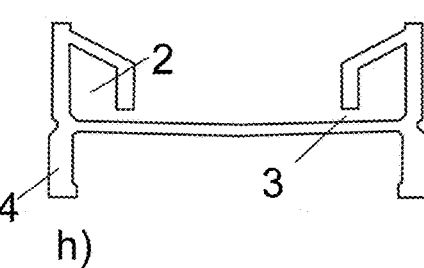
g)          h)
Fig. 5
Fig. 6
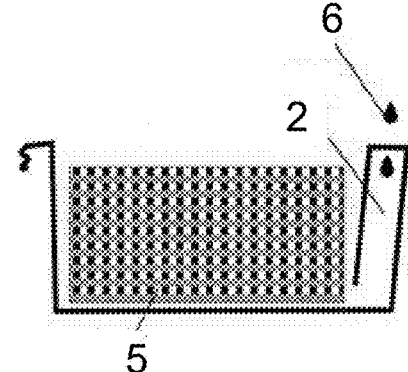

OPEN-TOP GUTTER

This application is a divisional application of U.S. Ser. No. 17/285,211 filed Apr. 14, 2021, which is a U.S. National Phase application of PCT/FI2019/050763 filed Oct. 25, 2019, which claims priority from Finland Application No. 20187155 filed Oct. 29, 2018 and Finland Application No. 20197004 filed Jan. 8, 2019, the entire disclosures of which are incorporated herein by reference.

FIELD OF THE INVENTION

The present invention relates to a water-conducting open-top gutter for the cultivation of plants. The presented solution also relates to an open-top gutter for the cultivation of plants, in which water is conducted along the gutter and further from the water space of the gutter to a substrate.

BACKGROUND OF THE INVENTION

Properties of gutters intended for the cultivation of plants, particularly in hydroponic applications (NFT, nutrient film technique), will be described herein.

Lettuce and herbs have been grown by hydroponic techniques for more than 30 years. The most efficient method is cultivation in gutters, the so-called moving gutter technique, in which plants are grown in small pots placed in holes for plants in solid gutters. The gutters move on a track, and the distance between the gutters is automatically increased according to the growth stage. A nutrient solution added to irrigation water is dosed at one end of the gutter, from which the solution flows along the inclined gutter, irrigating the plants in the pots along the way, and flowing out from the other end, to be recirculated after possible treatments. Such a recirculation of the nutrient solution may be turned on all the time or in cycles of, for example, 10 minutes of irrigation every 2 hours. The cycling will depend on e.g. the dimensions of other elements in the system, the season, the length of the gutter, the inclination, and the substrate. Typically, the gutter has a width of 75 mm and a length of 6 to 12 m. In particular, this applies to the cultivation of lettuce. In the cultivation of cucumber and tomato, the gutter may have a length of up to 100 m and a width of 20 to 30 cm.

The above-described cultivation in gutters has resulted in at least two funda-mental improvements. First of all, the growing density (plants per square meter) can be adjusted according to the growth, to ensure maximum utilization of the growing space and particularly the lighting. Secondly, because a nutrient solution can be dosed to the gutter even continuously, many times the amount needed, the nutrient composition may deviate from the optimum even to a great extent without affecting the growth, because the circulating solution supplies new nutrients continuously to the area of the root system. If several different plants are grown in the same circulating solution, or if the nutrient solution is not entirely optimal, cultivation with a circulating solution is the most functional technique without having to remedy distortions in nutrient contents by rinsing. This kind of a situation is often faced in e.g. organic fertilization, where nutrients are available but not in a correct proportion to the need.

For cultivation in gutters, seedlings are grown separately by sowing seeds in small pots which are arranged in honeycombs. Most commonly, irrigation is arranged as irrigation by sprinklers from above. Seedlings are transferred to plant holes in cultivation gutters. The holes in the gutters are made according to the need by the plant, and they can naturally not be changed later on.

For cultivating many different plants and particularly small plants (baby leaf, microgreens), the best solution is to use a so-called open-top gutter. The open-top gutter is entirely open on top, and the gutter is filled with a substrate, such as peat and mineral wool, without using separate pots. The seeds are sown at a desired density, as needed. For cultivation, the gutters are placed on a production line system of gutters, moved and irrigated at one end of the gutter, as described above. Advantages of the open-top gutter include the facts that no separate pots are needed, the sowing density can be varied as needed, no separate arrangement is needed for growing seedlings, and the gutter is easier to clean.

Problems with open-top gutters include poor passage of irrigation water through the substrate filling the gutter; the gutter may overflow, part of the substrate may be washed away with the circulating solution, and growth is uneven at the initial and terminal ends of the gutter. All these cause problems relating to the technique and the cultivation. To solve the problems of prior art, various methods of conducting water through an open-top gutter have been developed. As an example, an open-top gutter is provided with a perforated insert tray, the substrate and the plants being placed on the top, and the nutrient solution flowing under the tray and being sought by the roots of the plant. Another solution is to provide the gutter not with an insert tray but a narrower section, the substrate and the plants being placed on the top, and a passage for water flow being left at the bottom. Among other things, the following problems have been observed in said examples:

uneven growth caused by variation in the quality of the substrate in practice;

complex technique of filling the gutter and handling the substrate;

sensitivity of the performance to the inclination of the gutter;

change in the structure during cultivation;

problems in contact between water and substrate;

leaking of substrate into the water flute, causing clogging.

Problems with open-top gutters may also include special cases of fertilization, for example aquaponics, that is, combined fish breeding and cultivation of plants. It is possible to combine the circulation of nutrients produced by fish breeding and needed by plants, as long as the quantity of irrigation water circulated is many times the need for irrigation. Part of the minerals contained in fish feed eaten by fish is excreted in the form of water-soluble nutrients into the water used for fish breeding. These nutrients are very useful for plants. A problem is the diluteness of water used for fish breeding (concentration approximately 0.6 mS/cm, given in terms of electrical conductivity) compared with the optimum nutrient concentration of an irrigation solution for plants (about 2 mS/cm). This is one reason why a multiple amount of irrigation solution has to be supplied, compared with the need for water, which leads to problems of conducting water in cultivation in open-top gutters; an adequate amount of water cannot pass through the substrate but causes overflow or lack of nutrients.

Document U.S. Pat. No. 4,075,785 A presents an approach for cultivating plants in gutters. Water does not always flow through the substrate in the gutter as desired, but the moisture content of the substrate remains uneven, whereby either too much irrigation or drying will cause a reduction in crop yields.

Document WO 2012/172187 A1 describes a cultivation system comprising a special open-top gutter which is suitable and intended for a solid substrate, such as a sheet of mineral wool.

In a solution according to WO 2016/151186 A1, a cultivation gutter is divided into two parts by a partition wall structure, and water is intended to flow primarily in tunnels extending below the substrate and in a central space formed by the partition wall structure.

An open-top gutter intended for cultivation of plants and having a water space formed by the edge or the bottom of the gutter is presented in US 2005/0246956 A1 and U.S. Pat. No. 4,255,898 A.

SUMMARY OF THE INVENTION

An open-top gutter is used for the cultivation of plants.

In open-top gutters of prior art, the substrate constitutes a hindrance to a sufficient flow of water. Normally, in hydroponic cultivation, the amount of water supplied is many times greater than the need, to secure either uniformity of irrigation or a sufficient supply of nutrients. For example, in aquaponic systems, i.e. combinations of fish breeding and the cultivation of plants, dilute water from fish breeding has to be supplied in amounts many times greater than the water demand of the plants, to satisfy the need for nutrients.

A water-conducting open-top gutter according to the present solution removes the above described problems.

For example, in aquaponic systems, a water-conducting open-top gutter can be used, irrespective of the substrate, to supply dilute water from fish breeding in amounts many times greater than the water demand of the plants, to satisfy the need for nutrients.

A nutrient solution can be easily supplied in doses many times greater than the water demand, and the water will be quickly absorbed in the substrate along the entire length of the gutter.

In an example, the nutrient solution used for irrigation of plants is at least partly derived from nutrient salts of fertilizers, fish breeding waters, bioreactors, main or side streams of other processes, or combinations of these.

In an example, the substrate used for growing plants in the gutter is horticultural peat, mineral wool, glass wool, peat moss (sphagnum), wood fibre, coconut fibre, hemp fibre, or a mixture containing at least one of said substrate constituents.

In an example, the gutter is made of a metal or composite material by bending. In another example, the gutter is made by extrusion of plastic, aluminium, or other mixtures.

The gutter is an open-top gutter for cultivation of plants, comprising at least one water space formed by a double edge and being closed or almost closed at the top. Said water space is open at the bottom of the open-top gutter.

In an example, the water space has an open gap of 0.1 to 2 mm at the bottom of the open-top gutter. In an example, the water-conducting open-top gutter typically comprises a space for a water flow, formed by an edge structure and connected to a space for substrate via a narrow gap. Water is conveyed into the gap both by capillarity and by gravity, and via the gap further to the substrate both by capillarity and by gravity. At the water supply end, water may flow in the opposite direction.

Thanks to the double edge, the gutter is strong and still simple to manufacture.

The same double edge structure can be reproduced in gutters of different sizes. The width of the gutter can be selected according to the size of the plant desired.

With a narrower water-conducting open-top gutter, initial cultivation may easily be performed at a density increased by 50%, and because the initial cultivation makes up almost half of the whole growth cycle, cultivation efficiency may be increased by more than 25%.

For example, in Central Europe, a gutter with a special width of 100 to 140 mm is commonly used, because intensive sunshine makes the edge of a narrower gutter and the roots too hot. The double edge of the water-conducting open-top gutter prevents heat from being conducted to the substrate and thereby reduces said problem and allows a narrower dimensioning of the gutter and a higher growing density.

Alternatively, an open-top gutter is used for the cultivation of plants, which has at least one separate water space formed by a partially double bottom and connected to the bottom of the gutter via a bottom gap.

In an example, a water-conducting open-top gutter typically comprises a water space formed by an edge structure and connected to the bottom of the gutter via a gap. In plant cultivation applications, water flows in the direction of the gutter primarily along the water space and is conveyed to the substrate both by capillary and by gravity almost simultaneously over the whole length of the gutter. At the water supply end, water may flow in the opposite direction.

Thanks to the partially double bottom, the gutter is mechanically strong and still simple to manufacture.

A similar structure with a partially double bottom can be reproduced in gutters with different sizes. The width of the gutter can be selected according to the size of the plant desired.

A similar structure with a partially double bottom can be reproduced in gutters with different sizes. In the same way as above, the cultivation efficiency may be increased by more than 25%.

The gutter is an open-top gutter for cultivation of plants, comprising a space limited by two side walls and a bottom wall, and divided into gutter-like sections by at least one partition wall. The partition wall comprises at least one water space formed by a double wall, open at the bottom of the gutter. In an example, the water space is closed or almost closed at the top.

LIST OF FIGURES

FIG. 5 shows other alternative examples of a gutter according to the solution.

FIG. 6 shows an alternative additional example of a gutter according to the solution.

DETAILED DESCRIPTION OF THE INVENTION

Next, some water-conducting open-top gutters will be discussed with reference to FIGS. 1 and 2.

Figure 1:
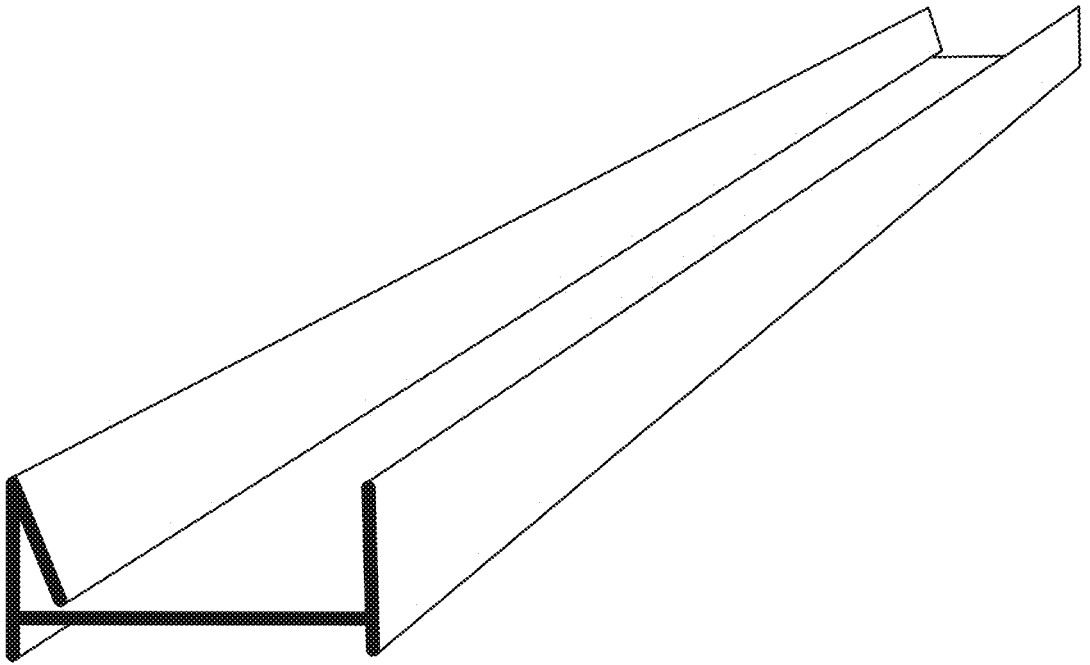
FIG. 1 shows an example of a gutter according to the solution.

FIG. 1 shows a typical shape of a water-conducting open-top gutter, the gutter having a length selected according to the need, advantageously 1 to 20 m.

Figure 2:
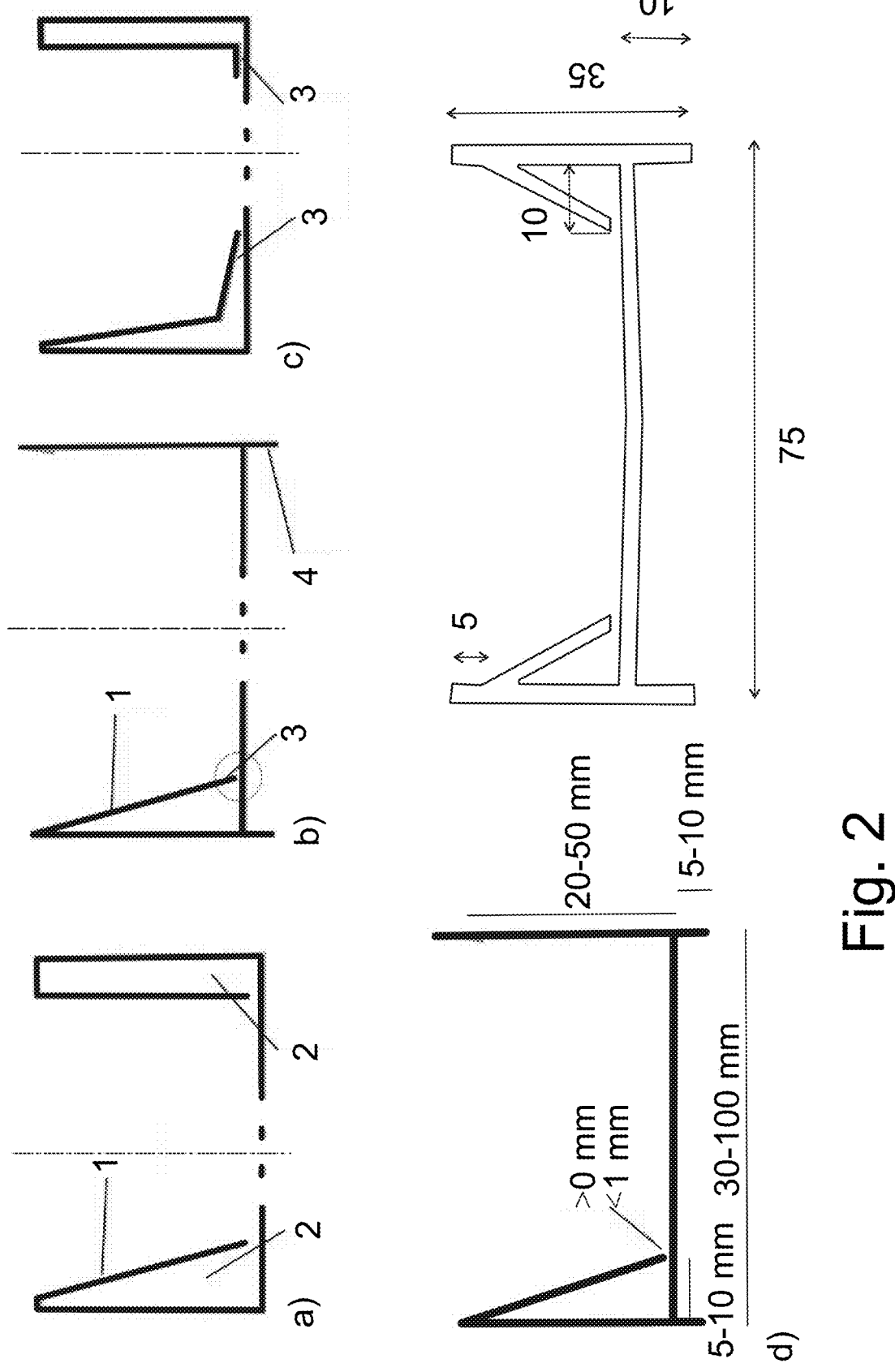
FIG. 2 shows other examples of a gutter according to the solution.

FIG. 2 shows advantageous cross-sections and dimensions of a water-conducting open-top gutter, that is, alternatives a to e.

A water-conducting section is formed by a double edge 1, whose inner edge is slightly open towards the bottom, leaving a bottom gap 3 for conveying water between the water space 2 and the substrate.

The double edge 1 may be provided on both sides or on one side only. In long gutters, e.g. longer than 6 m, as well as in wide gutters, e.g. wider than 60 mm, it is advantageous to provide both sides with a double edge 1, to secure irrigation as well as to support the structure.

The gutter may also comprise a lower rib 4 and other structural details, reinforcements, etc., for example to facilitate moving the gutter and to support its structure. In an example, the gutter comprises lower ribs 4 or other additional elements related to the movement, strength or functionality of the gutter.

Alternative e of FIG. 2 shows an advantageous design and dimensioning which enables sowing seeds in two rows in the same gutter, and the dimensioning is also directly suitable for most existing thinning systems. The curved shape of the bottom further facilitates the conducting of water from the water space to the substrate.

In some examples, the gutter is provided with a double edge either on both sides or on one side only. After the gutter has been filled with substrate, water will flow in the water space 2 enclosed by the double edge 1, quickly irrigating the substrate over the whole length of the gutter via the bottom gap 3, and not entraining substrate in the flow.

Lettuce and iceberg lettuce grow well in a water-conducting open-top gutter, providing a good yield when the growing density has been adjusted according to the need.

When starting the cultivation, a water-conducting open-top gutter (see FIG. 1) is filled with e.g. horticultural peat and compacted gently, and seeds are sown at a desired density. For this initial step of filling up and sowing, automatic filling and sowing machines are commonly available, which—after minor modifications—are suitable for use with a water-conducting open-top gutter. Examples of filling and sowing device brands include: V-Mosa, Hortimat, Mayer, Urbinati, Visser, Javo, DaRos, and Punnet.

After the sowing, the gutter is transferred to the cultivation site and irrigated by normal gutter irrigation nozzles (e.g. Netafim Maxi CNL, 12 l/h) to one end of the gutter. Preferably, this supply end is provided with a plug for closing the end of the gutter. From the supply end, water is partly absorbed into the substrate and flows, primarily in the water space 2 enclosed by the double edge 1, further down the gutter, simultaneously irrigating the substrate over its whole length. After initial irrigation for a period of, for example, 10 minutes, the gutter is irrigated again as needed. Water will run off from the other end of the gutter, whereby a spout is advantageously provided, for example by bending the bottom downwards. At the beginning of the cultivation, the gutters may be placed adjacent to each other, and the distance between the gutters is increased according to the growth. The water-conducting open-top gutter may be more efficient than a conventional closed gutter, particularly in the production of small plants.

Compared with gutters of prior art, the difference is, for example, that the double edge 1 constitutes a tunnel-shaped water passage extending in parallel with the substrate, all the way from the bottom to the top, for the free flow of water.

From this space, the water has a direct connection to the substrate via the bottom gap 3. If the substrate has a poor water absorption capacity, the water level will rise within the double edge 1, whereby the water will be forced by gravity to penetrate into the substrate and further within reach of the roots.

In the direction of the gutter, the water flows primarily in the tunnel-like water space 2 enclosed by the edge but not significantly in the substrate, whereby no substrate will be entrained in the circulating water. The water space 2 is connected to the substrate via a narrow gap. Both the width of the water space 2 and the width of the bottom gap 3 are essential factors for the functionality of the gutter. The width of the water space 2 is advantageously 5 to 10 mm, and the dimension of the gap is advantageously 1 to 2 mm, whereby no substrate will enter the water space 2, the root system will remain in the substrate, and only water will be passed through the gap.

The same structure of the double edge 1 can be reproduced in gutters of different sizes. The width of the gutter can be selected according to the size of the plant desired. For the smallest plants, so-called microgreens, a gutter as narrow as 30 mm will be sufficient, providing a maximum density of seedlings in the initial cultivation. The growing density is a significant factor on the profitability of the cultivation, particularly if the cultivation takes place partly or entirely under artificial light. In the Nordic countries, the most commonly used gutter model has a width of about 75 mm, and e.g. in Central Europe, a gutter with a special width of 100 to 140 mm is commonly used.

The productivity of an open-top gutter with a standard width of 75 mm can be improved by sowing several adjacent rows in the gutter, if the gutter has a double edge structure that conveys water through the gutter and enables the absorption of water into the substrate over the whole length of the gutter almost simultaneously. Without the double edge, the passage of water merely through the substrate over the whole length of the gutter is too slow.

We shall now discuss some alternative water-conducting open-top gutters with reference to FIGS. 3, 4, 5, and 6.

Figure 3:
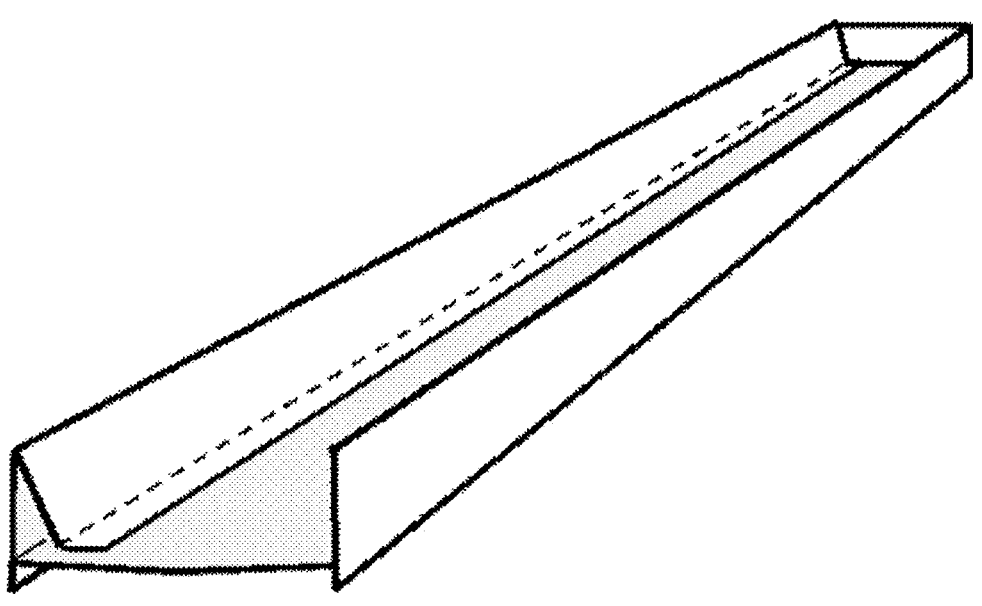
FIG. 3 shows an alternative example of a gutter according to the solution.
Figure 4:
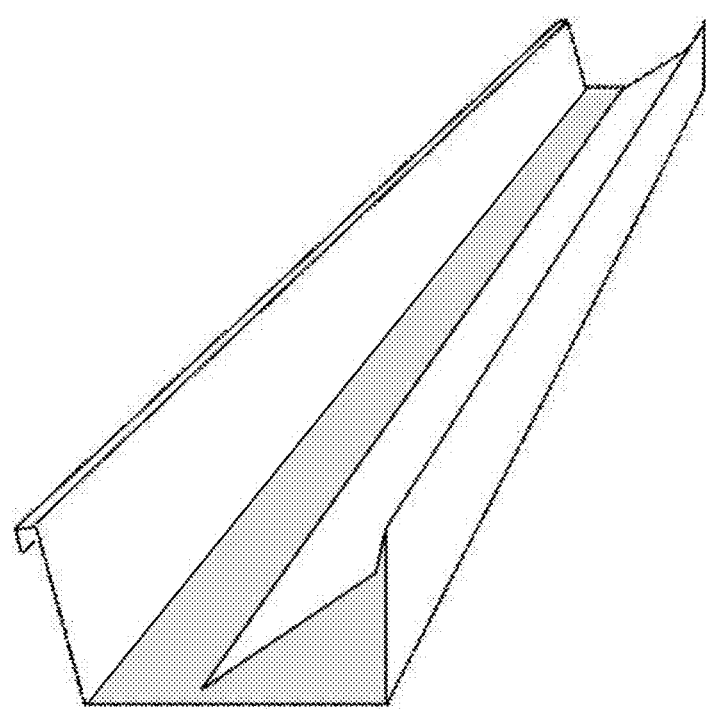
FIG. 4 shows another alternative example of a gutter according to the solution.

FIGS. 3 and 4 show simple designs of a water-conducting open-top gutter, the gutter having a length selected according to the need, advantageously 1 to 20 m.

FIG. 5 shows advantageous cross-sections of a water-conducting open-top gutter, namely alternatives a to h.

The water-conducting section, i.e. the water space 2, is formed by a double structure which is either a double edge 1 or a partially double bottom.

The double structure may be provided either on one side or on both sides, as shown e.g. in the alternatives f to h of FIG. 5. The double structure is provided with a connection, namely a bottom gap 3, for conducting water between the water space 2 and the other parts of the gutter.

In long gutters, e.g. longer than 6 m, as well as in wide gutters, e.g. wider than 60 mm, it is advantageous to provide both sides with a double edge 1, to secure irrigation as well as to support the structure. The gutter may also comprise a lower rib 4 and other structural details, reinforcements, etc., for example, to facilitate moving the gutter and to support its structure. In an example, the gutter comprises lower ribs 4 or other additional elements related to the movement, strength or functionality of the gutter.

Having a width of about 75 mm, the shapes of the cross-section of FIG. 5 are suitable as such for most existing thinning systems. In the alternatives f to h of FIG. 5, the curved shape of the bottom further facilitates the conveying of water from the water space 2 to the substrate.

The alternatives f to h of FIG. 5 show examples of gutters having a double edge 1 on both sides. After the gutter has been filled with substrate, water will flow in the water space 2 enclosed by the double edge 1, quickly irrigating the substrate over the whole length of the gutter via the bottom gap 3, and not entraining substrate in the flow.

Using these gutters, the cultivation is started, the gutter is transferred after the sowing, and the irrigation, including the initial irrigation, is carried out as described already above with reference to FIG. 1.

The difference to gutters of prior art is, among other things, the feature that the double structure constitutes a tunnel-shaped water space 2 for the flow of water in parallel with the substrate. From this space, the water has a direct connection to the substrate via the bottom gap 3. The water is absorbed into the substrate and further brought within reach of the root system. The water flows in the direction of the gutter primarily in the water space 2, but not significantly in the substrate, whereby no substrate is entrained in the circulating water. Both the size of the water space 2 and the width of the bottom gap 3 are of essential significance in the functionality of the gutter. Preferably, the water space 2 is so small that the water is in contact with the bottom gap 3 and further with the substrate over the whole length of the gutter. For example, in gutters for growing lettuce, the width of the water space 2 is advantageously 5 to 10 mm. The width of the gap can be selected according to the need. For the sake of cleanability, the gap is advantageously 2 to 5 mm in cultivation gutters. It is also possible that the gap is so small that the roots will not grow through it, even less than 0.1 mm, whereby the root system will remain in the substrate and only water will pass through the gap. This may be needed particularly in long-term cultivation.

The same double structure may be reproduced in gutters of different sizes. The width of the gutter can be selected according to the size of the plant desired. For the smallest plants, so-called microgreens, a gutter as narrow as 30 mm will be sufficient, providing a maximum density of seedlings in the initial cultivation. In the cultivation of tomato and cucumber, the width of the gutter is approximately 200 mm. The growing density is a significant factor on the profitability of the cultivation, particularly if the cultivation takes place partly or entirely under artificial light. In this case, the initial seedling density has to be high, and the seedling density is decreased by spacing out the gutters according to the growth. In the Nordic countries, the most common gutter type used for growing lettuce is a perforated gutter having a width of about 75 mm.

In the example of FIG. 6, the open-top gutter is filled with substrate 5 or with a substrate sheet where the irrigation 6 of plants, such as cucumber and tomato, takes place directly into the water space 2 in which the nutrient solution is conveyed over the length needed. While irrigation in conventional cultivation is plant-specific, such as dribbling irrigation, irrigation in a water-conducting open-top gutter can only be supplied to one end of the gutter, or, if necessary, directly to the water space 2 at desired intervals. In such an application, the substrate should be highly water absorbent, such as a mixture of moss and horticultural peat.

Next, the structure of some alternative water-conducting open-top gutters will be discussed with reference to FIGS. 7, 8 and 9 which show a cross-section of an open-top gutter.

The description of FIG. 7 below relates particularly to an open-top gutter with a double structure and a double edge, as discussed above in this description, and its operation.

Figure 7:
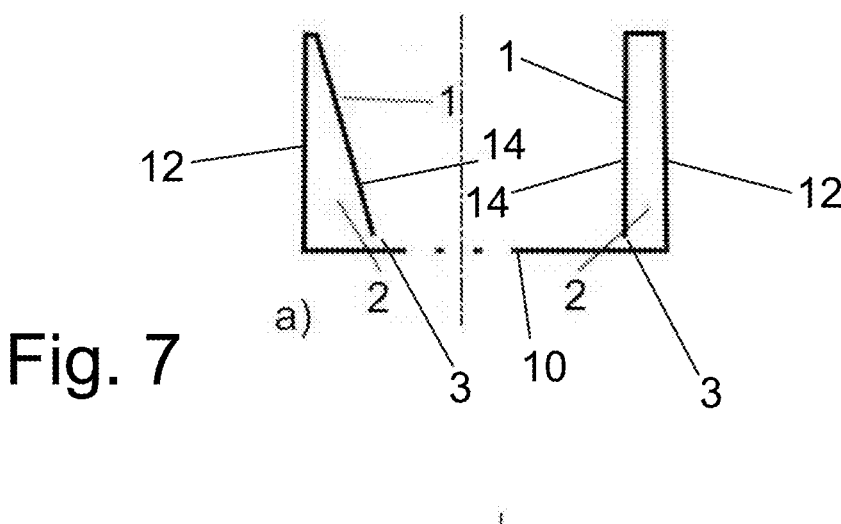
FIG. 7 shows the structure of an example of a gutter according to the solution.
Figure 8:
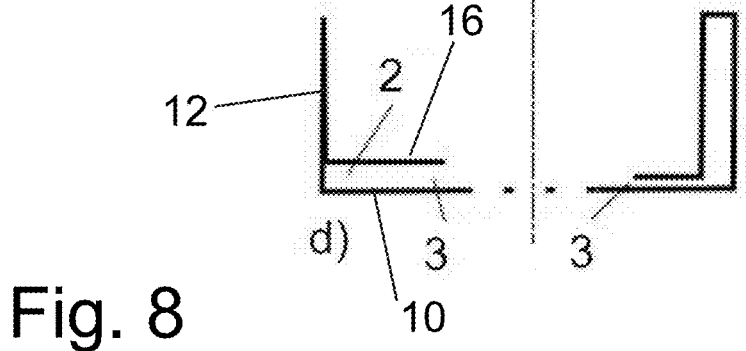
FIG. 8 shows the structure of an alternative example of a gutter according to the solution.
Figure 9:
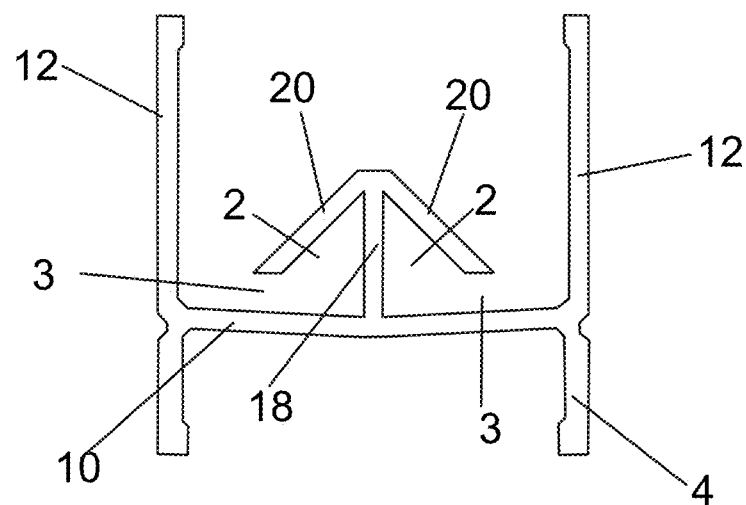
FIG. 9 shows a further developed example of a gutter according to the solution.

As shown in FIGS. 7, 8 and 9, the open-top gutter comprises a bottom wall 10 and two side walls 12 connected to it and transverse to the bottom wall 10, enclosing a trough-like space for the substrate in the open-top gutter. The bottom of said space is the bottom wall 10, onto which the substrate is placed. Each side wall 12 is fastened at its lower end to the bottom wall 10, for example to its edge. The bottom wall 10 and the side walls 12 may be seamlessly joined to each other and form an integral structure. During use, the bottom wall 10 is e.g. substantially horizontal and the side walls 12 are substantially vertical or slightly inclined. At least one rib 4 may be fastened to the bottom wall 10 and/or form an extension to the lower end of the side wall 12.

As shown in FIG. 7, the double edge 1 is formed in the open-top gutter by providing a partition wall 14 as an extension to the side wall 12, extending towards the bottom wall 10. In another example, the partition wall 14 extends towards the other side wall 12. An end of the partition wall 14, e.g. the outermost end, is spaced from the other side wall 12. An end of the partition wall 14, e.g. the lower end, is spaced from the bottom wall 10 so that a bottom gap 3 is formed between the end of the partition wall 14 and the bottom wall 10, for example seen in the vertical direction during the use. A water space 2 is formed between the partition wall 14 and the side wall 12, for example seen in the horizontal direction during the use. The bottom wall 10 acts as the bottom for the water space 2 and as the bottom at the bottom gap 3.

The side wall 12 and the partition wall 14 may be seamlessly joined to each other and form and an integral structure. During the use of the open-top gutter, the partition wall 14 is, for example, substantially vertical or slightly inclined.

For example, the bottom wall 10 extends straight and uniform from the water space 2 to the bottom gap 3 and further.

In an example, the vertical height of the water space 2 with respect to the bottom wall 10 is at least three fifths or at least two thirds of the height of the side wall 12.

The partition wall 14 is fastened to the side wall 12, e.g. its top or close to it, and the partition wall 14 may constitute a branch to the side wall 12. Alternatively, the partition wall 14 may be connected to the top of the side wall 12 at a point whose distance from the bottom wall 10 is greater than its distance from the top of the side wall 12, or the vertical distance from the bottom wall 10 is at least three fifths or at least two thirds of the height of the side wall 12.

The partition wall 14 may be provided, e.g. at its end on the side of the side wall 12 and/or at its lower end, with a section extending in a direction deviating from the major part of the partition wall 14. For example, said section at the lower end of the partition wall 14, at the bottom gap 3, may be inclined with respect to the bottom wall 10, or parallel with it.

In combination, the above-mentioned side wall 12 and partition wall 14 constitute said double structure and double edge.

The description of FIG. 8 below relates particularly to an open-top gutter with a double structure and a partially double bottom, as discussed above in this description, and to its operation.

As shown in FIG. 8, a partially double bottom is formed in an open-top gutter by providing an intermediate bottom 16 as an extension of the side wall 12 towards the other side wall 12. In an example, the intermediate bottom 16 extends towards the bottom wall 10. An end of the intermediate bottom 16, e.g. its outer end, is spaced from the other side wall 12 and covers the bottom wall 10 in part only. The end of the intermediate bottom 16 is spaced from the bottom wall 10 so that a bottom gap 3 is formed between the end of the intermediate bottom 16 and the bottom wall 10, for example when seen in the vertical direction during the use. A water space 2 is formed between the intermediate bottom 16 and the bottom wall 10, seen for example in the vertical direction during the use. The bottom wall 10 acts as the bottom for the water space 2 and as the bottom at the bottom gap 3.

The side wall 12 and the intermediate bottom 16 may be seamlessly joined to each other and constitute an integral structure. During the use of the open-top gutter, the intermediate bottom 16 is, for example, substantially horizontal or slightly inclined.

For example, the bottom wall 10 extends straight and uniform from the water space 2 to the bottom gap 3 and further.

In an example, the vertical height of the water space 2 with respect to the bottom wall 10 is not greater than two fifths or not greater than one third of the height of the side wall 12.

The intermediate bottom 16 may be connected to the bottom wall 10 or to the side wall 12, whereby the intermediate bottom 16 may constitute e.g. a branch to the bottom wall 10 or the side wall 12. Alternatively, the intermediate bottom 16 may be connected to the side wall 12 at a point whose distance from the bottom wall 10 is smaller than its distance from the top of the side wall 12, or the vertical distance from the bottom wall 10 is not greater than two fifths or not greater than one third of the height of the side wall 12.

The intermediate bottom 16 may be provided, e.g. at its end on the side of the side wall 12 or at its outermost end, with a section extending in a direction different from the main part of the intermediate bottom 16. For example, said section at the end on the side of the side wall 12 may be inclined with respect to the side wall 12, or parallel with it. Said section may extend against the side wall 12.

Said bottom wall 10 and intermediate bottom 16 together constitute said double structure and partially double bottom.

Anything that relates to the above described open-top gutter equipped with a double structure, a double edge, and/or a partially double bottom, and its operation, can be connected to the open-top gutter relating to FIG. 9 and discussed in the description below.

As shown in FIG. 9, the above described open-top gutter with a bottom wall 10 and side walls 12 is also provided with at least one dividing wall 18 connected to the bottom wall 10 and transverse to the bottom wall 10, dividing the trough-like space of the open-top gutter into adjacent trough-like compartments, e.g. at least two adjacent compartments. The dividing wall 18 is fastened at its bottom end to the bottom wall 10, for example its central section. The bottom wall 10 and the dividing wall 18 may be seamlessly joined to each other and constitute an integral structure. During the use, the dividing wall 18 is, for example, substantially vertical.

A water space 2 is formed in the open-top gutter by providing a partition wall 20 as an extension to the dividing wall 18, extending towards either the bottom wall 10 or the side wall 12. The end of the partition wall 20, e.g. its outer end, is spaced from the side wall 12 and covers the bottom wall 10 in part only. The end of the partition wall 20, e.g. its outer end, is spaced from the bottom wall 10 so that a bottom gap 3 is formed between the end of the partition wall 20 and the bottom wall 10, seen e.g. in the vertical direction during the use. The water space 2 is formed between the partition wall 20 and the dividing wall 18, seen e.g. in the horizontal direction during the use. In addition, or alternatively, the water space 2 is formed between the partition wall 20 and the bottom wall 10, seen e.g. in the vertical direction during the use. The bottom wall 10 acts as the bottom for the water space 2 and as the bottom at the bottom gap 3.

The dividing wall 18 and the partition wall 20 may be seamlessly joined to each other and constitute an integral structure. During the use of the open-top gutter, the partition wall 20 is, for example, substantially vertical, substantially horizontal, or slightly inclined.

For example, the bottom wall 10 extends straight and uniform from the water space 2 to the bottom gap 3 and further.

The partition wall 20 is connected to the dividing wall 18, e.g. its top or a location close to it, and/or in such a way that the partition wall 20 constitutes a branch to the dividing wall 18.

The partition wall 20 may be provided, e.g. at its end on the side of the dividing wall 18 or at the end on the side of the bottom gap 3, e.g. the outer end, with a section extending in a direction different from the main part of the partition wall 20. For example, said section at the end of the partition wall 20 or at the bottom gap 3 may be inclined or parallel to the bottom wall 10 or the dividing wall 18.

A water space 2 of the above described type may be provided on both sides of the dividing wall 18, with respective bottom gaps 3 and partition walls 20.

The height of the dividing wall 18 may correspond to the height of one or more side walls 12, or it may be lower than them. In an example, the vertical height of the dividing wall 18 is not greater than one half, not greater than two fifths, or not greater than one third of the height of the side wall 12.

The above-mentioned partition wall 20, together with the bottom wall 10, may constitute said double structure and partially double bottom, and/or said partition wall 20 together with the dividing wall 18 may constitute said double structure and partially double bottom. In combination, the partition wall 20 and the dividing wall 18 constitute a double wall forming the water space 2.

For example, the double wall is adapted to constitute the tunnel-shaped water space 2 for the flow of water next to the substrate. For example, the double wall is used for conveying water, and it comprises a connection formed by the bottom gap 3 for conveying water between the water space 2 and the other parts of the gutter. For example, the double wall is provided on both sides or only one side of the dividing wall 18.

The above described examples do not restrict the solution presented. The solution in question is presented in the appended claims.

The invention claimed is:

1. An open-top gutter for cultivating plants, comprising:
a space delimited by two side walls and a bottom wall and divided into trough-like compartments by at least one dividing wall, wherein:
the dividing wall is a linear wall that includes a first end and a second end opposite the first end, the dividing wall being connected to the bottom wall via the first end of the dividing wall with the second end of the dividing wall being away from the bottom wall,
a partition wall is connected to the second end of the dividing wall with the partition wall extending towards the bottom wall starting at the second end of the dividing wall, a free end of the partition wall being spaced from both the side walls and the bottom wall, at least one water space is formed at a bottom of the gutter by the bottom wall, the dividing wall and the partition wall, a bottom gap is open at a bottom of the gutter and is formed between the free end of the partition wall and the bottom wall, and the bottom wall is a bottom for both the water space and the bottom gap.

2. The open-top gutter according to claim 1, wherein the water space is trough-like, and the trough-like compartments are adjacent.

3. The open-top gutter according to claim 1, wherein the water space is open 0.1 to 2 mm from the bottom wall of the open-top gutter.

4. The open-top gutter according to claim 1, wherein the gutter is made of metal or composite materials.

5. The open-top gutter according to claim 1, wherein the gutter is made of plastic or aluminium.

6. The open-top gutter according to claim 1, wherein the gutter further comprises a substrate for plants the substrate including at least one of the following substrate constituents: horticultural peat, mineral wool, glass wool, sphagnum, wood fibre, coconut fibre and hemp fibre.

7. The open-top gutter according to claim 1, further comprising a nutrient solution used for irrigation of the plants, which is at least partly derived from nutrient salts of fertilizers, fish breeding waters, bioreactors, or combinations of these.

8. The open-top gutter according to claim 1, wherein the bottom wall has a curved shape for the purpose of conveying water from the water space to a substrate.

9. The open-top gutter according to claim 1, wherein the width of a bottom gap is 2 to 5 mm.

10. The open-top gutter according to claim 1, wherein the water space is arranged to allow water to flow in the water space and to irrigate a substrate via the bottom gap over whole length of the open-top gutter when the open-top gutter is filled with the substrate.

11. The open-top gutter according to claim 1, wherein the water space is configured in such a way that the water is in contact with the bottom gap and further with a substrate over whole length of the open-top gutter when the open-top gutter is filled with the substrate.

12. The open-top gutter according to claim 1, wherein the dividing wall and the partition wall are configured to constitute a tunnel-shaped water space extending in parallel with a substrate, for flow of water.

13. The open-top gutter according to claim 1, wherein the dividing wall and the partition wall are for conducting water and the dividing wall and the partition wall comprise a connection formed by the bottom gap for conveying water between the water space and other parts of the gutter.

14. The open-top gutter according to claim 1, wherein the partition wall is provided on both sides or only one side of the dividing wall.

15. Utilizing an open-top gutter in the cultivation of plants comprising utilizing the open-top gutter according to claim 1.

16. A method in cultivation of plants, comprising cultivating plants in the open-top gutter according to claim 1.

* * * * *